United States Patent Office 3,536,828
Patented Oct. 27, 1970

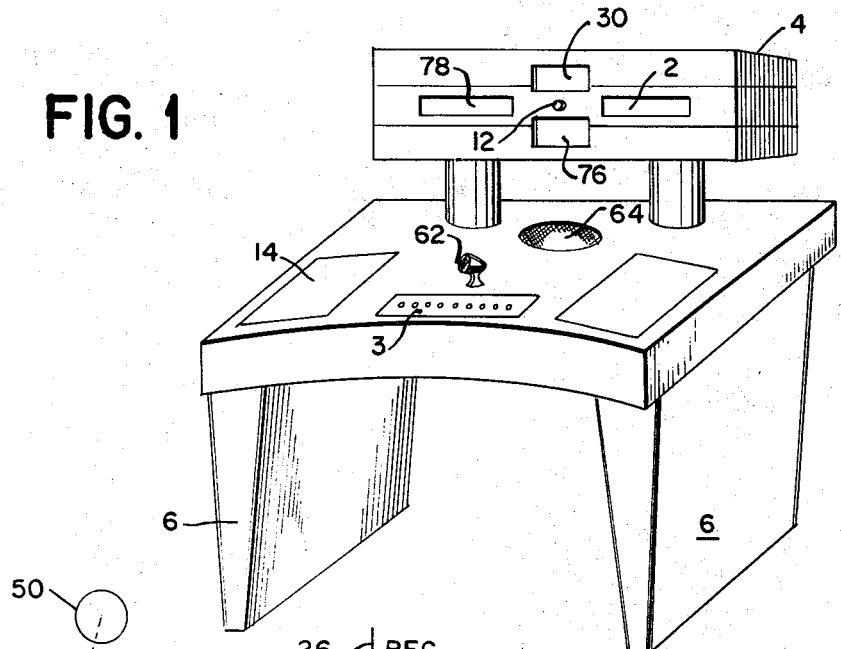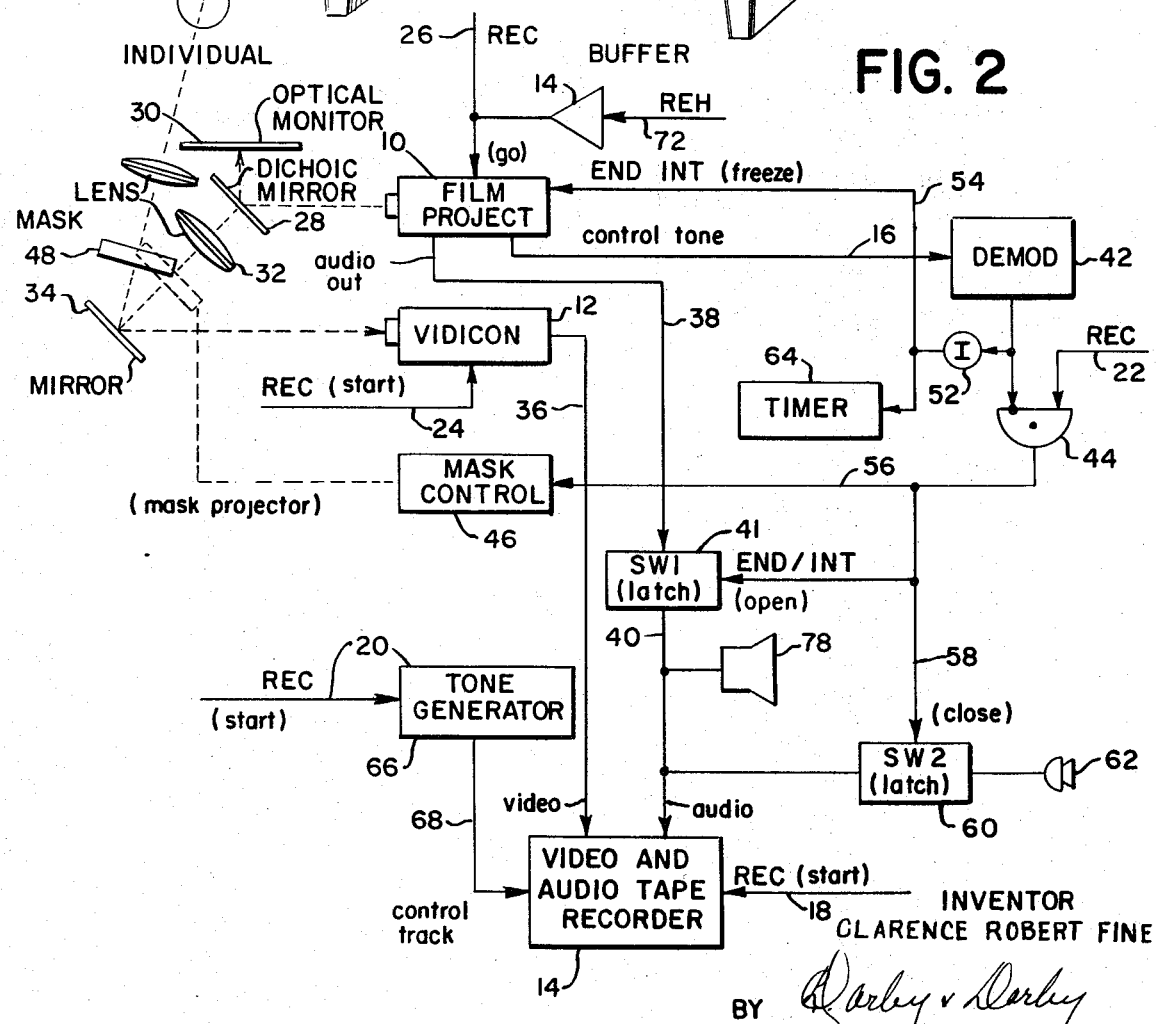

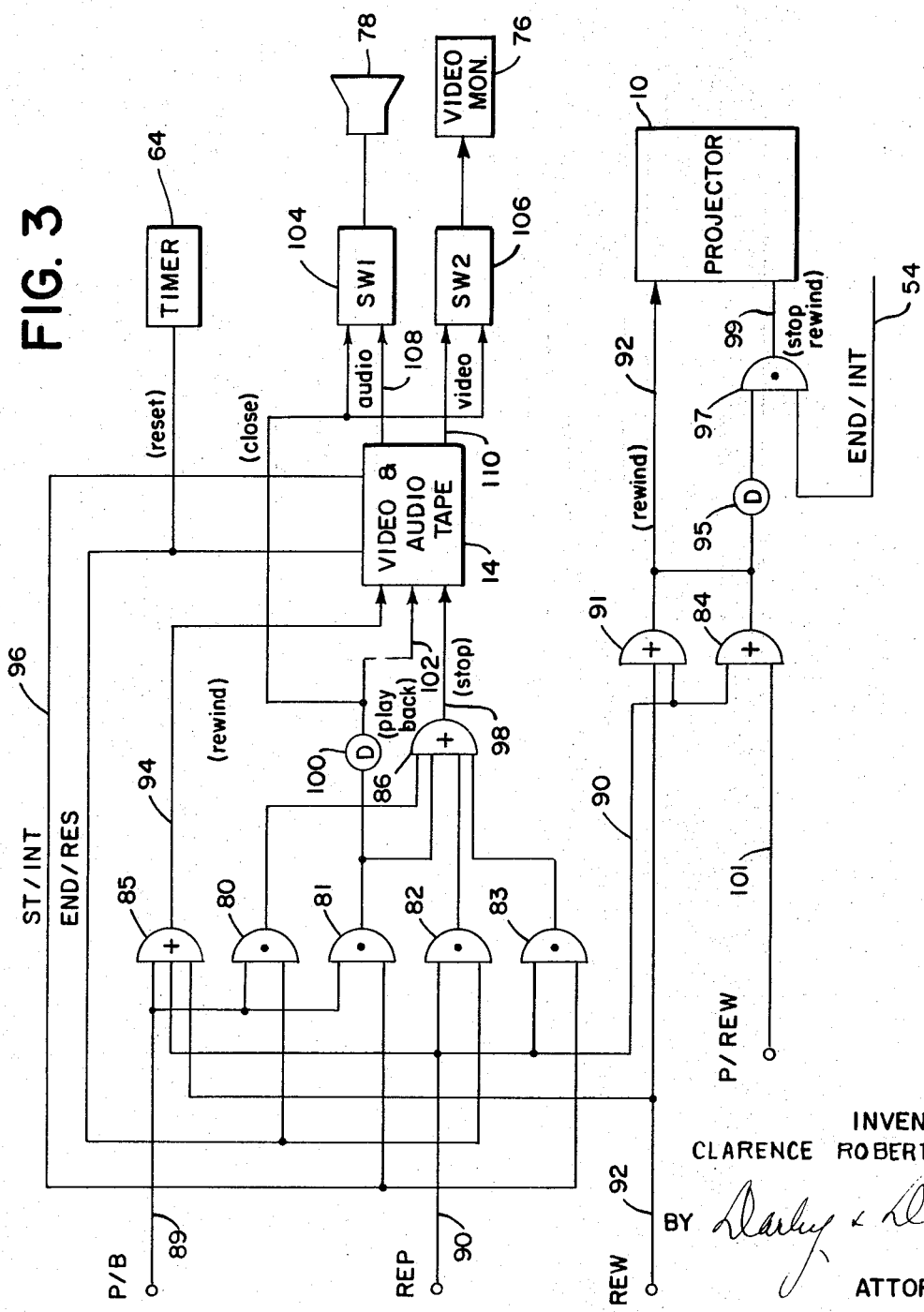

3,536,828
AUDIO VISUAL PROCESS AND APPARATUS
Clarence Robert Fine, 570 North St.,
Harrison, N.Y. 10528
Filed June 9, 1967, Ser. No. 644,910
Int. Cl. H04n 5/78
U.S. Cl. 178—6.6                                11 Claims

ABSTRACT OF THE DISCLOSURE

Audio visual apparatus for preparing an audio and visual record of the interrogation of an individual and his response to such interrogation, comprises a film projector for projecting a visual image of an interrogator and replaying a prerecorded interrogation, and a video camera for relaying the projected film image to a video tape recorder which also records the oral interrogation. The film in the projector includes a special control track which indicates the end of the interrogation and which, in turn, causes the input to the video camera to switch from the projected image to the individual himself. Means are provided to permit the playback of a portion of the video tape or to permit a filmed interrogation to take place without recording it on the video tape.

---

The present invention relates to the application of audio visual techniques to the testing, training or interviewing of individuals.

The training of individuals, such as salesmen, is normally a time-consuming job which desirably should be automated as much as possible. Although some effort has been made in the past to adopt audio-visual techniques for this purpose, such prior art efforts have proven ineffectual or, at best, have come far short of realizing their full potential.

The present invention provides fully automated apparatus capable of producing a visual and audio record of a prerecorded interrogation and an individual's spontaneous response thereto. The apparatus simulates the conditions which an individual would encounter in practice, and, therefore, is superior to known prior art audio visual devices for this purpose wherein the artificial environment of the individual undergoing the testing process is undesirable from a psychological point of view.

The invention has utility whenever it is desired to obtain a permanent record of an individual's response to any form of interrogation. For example, the invention can be used in the testing or training of employees, customers, students, etc., or it may be used for the purpose of interviewing potential employees. In the following specification and claims, the term "interrogation" is intended to refer to an oral presentation to which an individual is expected to respond. The interrogation will customarily be in the form of a question and therefore the term "interrogation" has been selected for descriptive purposes. It is to be understood, however, that the term "interrogation" as used herein includes any other comment or remark as to which it is intended that there be a response. Similarly, subsequent reference to an "interrogator" merely refers to the person who is questioning, interviewing, or teaching the individual whose performance is to be evaluated, and is not intended to imply any limitation whatsoever in regard to the form of the information. Hereinafter, reference to an "individual" refers to the subject or person whose visual and audio response is to be recorded.

Briefly, in accordance with the invention, a prerecorded visual and audio record of an interrogator and his interrogation is adapted to be replayed at the option of the individual undergoing the test. When the individual actuates a RECORD switch, the image of the interrogator is projected onto a monitor screen while at the same time his interrogation is audibly replayed. Both the visual and audio portions of the interrogation are recorded on video tape at the same time they are presented to the individual undergoing the test. At the end of the interrogation, means are provided to switch the input to the video recorder from the interrogator to the individual being tested whereby his response to the interrogation is sequentially recorded immediately after the recorded interrogation.

The prerecorded program may include a number of separate interrogations and each separate response is recorded immediately thereafter so that when the video tape has been completed, it can be forwarded to a central station and replayed in its entirety to fully observe the individual's response to the interrogation. It has been found particularly desirable to record both the interrogation and the individual's response, because this enables a more comprehensive analysis of the individual's performance and his reaction to different approaches by the interrogator. If desired, the individual undergoing the test may be able to rehearse his response before it is recorded, or he may be permitted to replay the recorded video tape to observe his performance and, if desired, repeat the entire sequence.

In the drawings:

FIG. 1 is a perspective view of the apparatus which would be used by the individual;

FIG. 2 is a block diagram of the circuits used for the RECORD and REHEARSE functions of the device; and FIG. 3 is a block diagram of the circuits which would be used for the PLAYBACK, REPEAT, and REWIND functions of the device.

FIG. 1 is a perspective view of the console containing the audio visual apparatus according to the invention as it would appear to the individual undergoing a test. Whenever possible, the elements of FIG. 1 have been numbered in accordance with the subsequent description relating to the block diagrams of FIGS. 2 and 3 to indicate identical parts.

The individual sits in front of the console, and, in the preferred embodiment, inserts a film cartridge into the aperture 2. The film cartridge includes a film of the interrogator and a sound track containing the interrogation. Additionally, a special control track is provided to initiate various system operations as explained below. Hereinafter, reference to the projector is intended to include its sound reproducing equipment and the control track sensing means.

A push-button control panel 3 includes seven switches capable of initiating seven different functions of the machine as described below with reference to FIGS. 2 and 3. An audio-video tape record/playback unit (hereinafter called a video tape recorder) is shown schematically at 14. The permanent audio-video record of the interrogation and response is recorded on the video tape of recorder 14.

The console further includes an optical monitor screen 30 (on which the movie image is projected), a video monitor screen 76 for playback of the video from video recorder 14, a loudspeaker 78 and a timer unit 64 for purposes described below. Additionally, a television camera such as shown at 12 and a microphone 62 pick up the video and audio portions of the individual's response. The console includes suitable lighting units 4 properly arrayed and a pair of hollow supporting legs 6 in which the necessary electronic equipment can be stored. The general system operation can be appreciated in the light of the following generalized discussion of FIG. 1.

After the individual under test has pushed the proper button on control panel 3 to turn the machine "on" and inserted a suitable film cartridge or cassette into the slot 2 (and assuming that the video tape recorder 14 contains the necessary recording tape), the device is ready to operate.

Assume, for purposes of explanation, that the device is being used to train a salesman to respond to certain situations which may be encountered with different customers, and that the purpose of the tape in this instance is to provide a permanent record which his employer can observe to determine the manner in which the individual reacts to various sales conditions. Accordingly, the individual pushes the proper button on panel 3 to place the machine in its RECORD mode. Immediately, a film of the interrogator (which in this case will be a "customer") is projected onto the optical monitor screen 30 while the audio portion of the sound track is replayed through loudspeaker 78. Simultaneously, a portion of the projected image is reflected onto the video camera 12 which is coupled to the video tape recorder 14. Recorder 14 also is responsive to the sound track of the film so that both the video and audio portions of the interrogation are recorded on the video tape of recorder 14.

At the end of the interrogation (for example, a question relating to the product which the salesman is being trained to sell) a signal from the control track on the film transfers the video recorder input from the projector to the individual. At the same time, the image of the interrogator is frozen on the optical monitor screen 30 to simulate actual sales conditions with the individual feeling as if he is speaking directly to the interrogator or customer. As the individual answers the question his response is recorded both on the video and audio portions of the tape recorder 14 so that subsequently his employer can observe his appearance as well as his oral answer to the interrogation.

If desired, the timer 64 may present a continual indication of the elapsed time to the individual during his response to the interrogation. At the end of the individual's response, he pushes another one of the buttons on panel 3 to return the device to its initial state, i.e. in preparation for a second interrogation and response sequence.

If, instead of actually recording his response, the individual wishes to merely rehearse his response to a given interrogation, he pushes a different one of the buttons on panel 3 to place the machine in a REHEARSE mode. In this mode, the data recorded on the film is replayed in the same fashion as previously but the tape recorder 14 is disabled so that none of the filmed information is recorded on the video tape although it appears on the optical monitor screen 30 and loudspeaker 78 in the same fashion as before.

If the individual wishes to hear the interrogation and his response as recorded on the video tape, he pushes a PLAYBACK button on the panel 3 which automatically rewinds the video tape to the beginning of the interrogation, after which playback of the interrogation and response proceeds. If the individual does not like the recorded presentation, he can push a REPEAT button on panel 3 causing the tape and film to rewind so that the interrogation and response can be recorded over again.

After each of the filmed interrogations has been responded to, the entire video tape and film are rewound completely so that the film can be reused by another individual and the tape replayed in order to evaluate the individual's response.

FIGS. 2 and 3 are block diagrams of the circuits required to enable the system operation described with reference to FIG. 1. To facilitate the description, the control signals and the operations initiated thereby are indicated in FIGS. 2 and 3. Thus, a legend in capital letters adjacent a line indicates the control signal applied to that line, while a legend in lower case letters and in parenthesis adjacent a line manifests the system operation which is initiated by the indicated control signal. Legends within blocks, of course, identify the apparatus within that block.

Further in the interest of describing the invention, the system block diagram has been separated into two parts. Thus, the block diagrams of the circuits required for the RECORD and REHEARSE modes are shown in FIG. 2 while those circuits required for the REWIND, PLAYBACK and REPEAT modes are shown in block diagram form in FIG. 3. Each of the functions RECORD, REHEARSE, REWIND, PLAYBACK and REPEAT are initiated by the manual actuation of a suitable switch on control panel 3 (FIG. 1) and the subsequent system operation in response to each function switch is described in detail below. In order to avoid unduly complicating the block diagrams, each line which is energized in response to one of these switches is labeled with a corresponding legend. In other words, and by way of example, each line to which the legend REC is adjacent, is a line on which an actuating signal appears when the switch corresponding to the RECORD function is actuated.

Further in the interests of simplifying the explanation of the invention, the various circuits required to start and stop the apparatus are not illustrated, even schematically, since features of this nature would be obvious to anyone of ordinary skill in the art. Thus, the system will have two additional switches, one for enabling all of the various circuits so that the system operation can proceed in accordance with the user's intent (i.e. an on-off switch), and a switch for rewinding both the film and video tape in their entireties and independently of any control signals.

Referring to FIG. 2, the film projector 10 (e.g. of the 8 mm. type), television camera 12 (e.g. a vidicon), and the video and audio tape recorder 14 may all be commercially available items with one minor exception. Thus, the film fed through the projector 10 will have a separate control track on which a fixed frequency tone is magnetically recorded for the purpose of initiating and stopping various system operations. This control tone in effect merely distinguishes successive filmed interrogations so that the required control signals will be generated at the proper time. In practice, two control tones may be used to produce such signals during the replaying and rewinding, respectively, of the projector film. However, for purposes of simplicity of explanation, it is assumed hereinafter that a single control track is used on which appears a magnetically recorded carrier tone adjacent each filmed interrogation (i.e. a gap in the carrier indicates an end of one interrogation and the start of the next). Thus, projector 10 must also include a standard transducer assembly (not shown) for reproducing these control tones on line 16.

The remaining blocks illustrated in FIG. 2 are either conventional circuits or else would be obvious to one of ordinary skill in the electronics arts and therefore require no further description. The operation of the system illustrated in FIG. 2 is as follows.

Assume that the on-off switch (not shown) has been turned "on" and that the system is ready to go. Further assume that the subject is ready to make his presentation and desires that it be recorded. Accordingly, the subject pushes the RECORD switch (not illustrated) to apply an energizing signal by obvious means (not shown) to each of the lines 18, 20, 22, 24 and 28 (all of which are labeled REC).

The signal on line 26 energizes the lamp and motor of projector 10 to initiate projector operation. The optical output of the projector 10 is partially reflected by a standard dichoic mirror 28 to the optical monitor screen 30. Simultaneously, a small percentage (e.g. 30%) of the optical output of the projector 10 is transmitted through dichoic mirror 28 to vidicon 12 along an optical path defined, for example, by a lens 32 and a reflecting mirror 34. Thus, the projector output is simultaneously applied to the optical monitor screen 30 and the vidicon 12.

Vidicon 12 also commences operation when the RECORD switch is actuated due to the start signal on line 24. Thus, the output of the vidicon (which is the projected image observed by the subject) is fed via line 36 to the video portion of the tape recorder 14 where it is recorded, tape recorder 14 having also been started by application of a REC signal to line 18.

Simultaneously with the recording of the optical output of projector 10 on the video portion of recorder 14, the audio output of the projector is coupled to a loudspeaker 76 and the audio portion of recorder 14 via lines 38 and 40 through a normally closed switch 41. In this fashion, the audio and visual interrogation recorded on the film cartridge loaded into projector 10 is recorded on the tape of video tape recorder 14 at the same time it is being observed and heard by the individual.

When the film presentation is terminated, the control tone on line 16 also terminates causing a demodulator 42 to remove the inhibit input to an AND gate 44 which normally maintains gate 44 closed. Since the RECORD switch has been actuated (after which a signal remains on the lines labeled REC until a subsequent operation is initiated either manually or automatically), an end of interrogation (END/INT) signal is produced at the output of AND gate 42.

This END/INT signal functions to switch the input to the video and audio tape recorder 14 from projector 10 directly to the subject who is being tested. Thus, the END/INT signal is applied to a mask control circuit 46 which physically moves a mask 48 from the optical path between the subject 50 and vidicon 12 into the optical path between projector 10 and vidicon 12 (as shown in dotted lines). Although the actual construction of the mask control circuit 46 and the mask for accomplishing this purpose is not believed to be known per se, various well known expedients may be used to accomplish this objective and therefore the mask and control circuit are only illustrated schematically. By way of example, the mask control 46 may comprise a solenoid which is energized upon application of the END/INT signal to physically pivot or otherwise position the mask 48 in either of the two illustrated optical paths.

The D.C. output of the modulator 42 is also fed through an inverting circuit 52 back to projector 10 via line 54 where it causes the motor of projector 10 to be de-energized, but leaves the projector lamp on (at half current to prevent burning) so that the image of the filmed interviewer is maintained on the optical monitor screen 30. This projection of a still image on the optical monitor screen 30 has been found to be an important phychological feature of the invention in that it stimulates the actual conditions of an interview (or any other presentation) and helps the individual under test to relax during his presentation. Instead of freezing a still image on the optical monitor screen 30, it would be possible to continue the film projection so that the subject would continually observe an animated image during his presentation. It is also contemplated that a timing line might be projected onto the optical monitor screen after the interviewer sequence has ended so that the individual being tested may be made aware of time limitations.

The END/INT signal from gate 44 is also applied to lines 56 and 58 which, respectively, open and close switches 41 and 60 thereby switching the input line 40 of the audio portion of tape recorder 14 from the audio output line 38 of projector 10 to the output of a microphone 62 into which the subject is speaking. Finally, if desired, the END/INT signal may be applied to a timer 64 via line 54 so that the individual can observe the elapsed time of his presentation.

After the individual has finished his presentation, the stop switch (not shown) is actuated causing the system to return to its initial condition, i.e. ready to commence the next sequence projected by projector 10.

A tone generator 66 responsive to the REC signal on line 20 and having an output 68 connected to the recorder 14 is also illustrated in FIG. 1. The purpose of tone generator 66 is to apply control signals to the tape on which the presentation has been recorded to permit the necessary controls of recorder 14 during the play-back and rewind operations as explained in greater detail below with reference to FIG. 3. These tones are similar to the control tone recorded on the film within projector 10 and serve essentially the same purpose in segregating the recorded cycles (interrogation and response) on the video tape. Since it is the absence of a tone which indicates the end of a segment it is contemplated that after the stop switch has been actuated, the recorder 14 will continue to run a slight distance after the tone generator 66 has been de-energized so as to permit a gap in the tone recorded between adjacent cycles. On the video tape also two separate control tones may be used in practice, but since the purpose essentially is only to segregate the end of a recorded response from the start of the next recorded interrogation, a single control tone may be assumed for purposes of explanation.

It is contemplated that the individual may desire to rehearse his presentation before making a permanent record of it. For this purpose, all that is required is that he be able to observe and listen to the optical and audio output of projector 10 without these outputs being recorded on the video and audio tape recorder 14. Hence, if instead of pushing the RECORD button on panel 3 (FIG. 1), the subject pushes the REHEARSE button, a signal is applied to the line 72 which is passed through a buffer amplifier 74 to start the projector 10. Since a start signal is not applied to the vidicon 12 or recorder 14, the optical output of projector 10 is not recorded. When the control tone on line 16 terminates at the end of the interviewer sequence, the END/INT signal from inverter 52 freezes the projector image on the optical monitor screen 30, during which time the subject can rehearse his presentation. Since no REC signal appears on any of lines 18, 22 and 24, the recording equipment remains de-energized. The timer 64, however, may be energized so that even during rehearsal the subject can observe his time limitations.

FIG. 3 is a block diagram of the control circuits used during the PLAYBACK, REPEAT and REWIND functions. The video tape recorder 12, projector 10, and timer 64 are the same elements as indicated in FIGS. 1 and 2. Additionally, the video monitor screen 76 and loudspeaker 78 are required for playback.

The PLAYBACK, REPEAT and REWIND functions are each initiated by actuation of a suitable switch on the control panel of the machine, and the lines in FIG. 3 energized thereby include the legends P/B, REP and REW, respectively. In the PLAYBACK mode, the video tape is rewound to the beginning of the last recorded interrogation, after which playback of that interrogation and the individual's response thereto is automatically replayed over loudspeaker 78 and video monitor screen 76. In this mode, it is not necessary to rewind the film in the projector 10 since all of the film information has been recorded on the video tape.

In the REPEAT mode, the subject undergoing the test (if he is dissatisfied with his presentation) can re-record an interrogation and response to his satisfaction. Thus, in this mode, both the video tape in recorder 14 and the film within the projector 10, are rewound and then stopped so that they are in position to replay and record the same portion of the film which had previously been recorded.

In the REWIND mode, the entire recorded video tape and the film within the projector cartridge are completely rewound so that the film may be reused and the video tape used for evaluation of the individual's performance as manifested by his recorded responses.

It is recalled that during recording of the interview and presentation on the video and audio tape recorder (of FIG. 1), a tone generator 66 records a control signal on the video tape. This control signal indicates the start of an interrogation and the end of a response. In the following description the designations ST/INT and END/RES are used respectively to indicate lines on which these various signals appear. The END/INT signal is the same as that previously discussed with reference to FIG. 1.

In the interest of simplicity, the various control functions required for the PLAYBACK, REPEAT and REWIND functions have been schematically illustrated by means of a logic diagram incorporating four AND gates 80 to 83 and two OR gates 85 and 86. Since the tape control signals which segregate the various interrogation-response cycles are manifested by the absence of a control tone, it is necessary to employ some form of demodulator means (as in FIG. 2) to convert the "absence" of a tone into a suitable DC signal which can be used to control the various functions described below. Such demodulator means have not been shown in FIG. 3 only in the interests of simplicity.

As in the case of the RECORD and REHEARSE modes, the switches which initiate the PLAYBACK, REPEAT and rewind functions are also of the latching type which means that the signals applied to the lines 88, 90 and 92 remain on the line until the full sequence of operation to be initiated by that signal have been completed, or until a second switch is actuated. The operation of the circuit shown in FIG. 3 is as follows.

When the subject presses or actuates the PLAYBACK switch, line 89 is energized which, in turn, energizes a video tape rewind line 94 causing the tape to be rewound. The tape rewinds until a ST/INT signal is detected and applied to the control line 96 to enable the AND gates 81 and 83. Because of the application of the P/B signal to gate 81, gate 81 is opened to pass a signal through OR gate 86 to a stop control line 98 which, in an obvious fashion, stops the tape rewind operation. The output of gate 81 is also applied through a delay line 100 to a playback control line 102 which causes the tape to commence running in a forward direction and enables all of the record playback circuitry for playback purposes. At the same time, the playback control line 102 closes switches 104 and 106 so that the audio output from the tape recorder 14 on line 108 and the video output on line 110 may be coupled, respectively, to loudspeaker 78 and the video monitor screen 76. Hence, the individual undergoing the test can listen to and observe the interrogation and response cycle last recorded.

When the end of the response is reached, the END/RES signal on the tape control track (applied by tone generator 66 of FIG. 1) enables the AND gates 80 and 82. AND gate 80 also receives an input from the P/B signal on line 89 and therefore passes a signal through OR gate 86 onto the stop control line 98 terminating the video and audio tape playback. From the foregoing description, it is apparent that the control signals applied to the playback and stop control lines 102 and 98 need not be of prolonged duration and can be the type which initiate an operation that continues until a second operation is initiated. Circuits for this purpose are common and are represented in their most primitive form by latching relays.

After the tape has been stopped, the PLAYBACK option is over and the subject may continue to the next interrogation according to the description of FIG. 2 or, if he is dissatisfied, repeat the entire procedure by actuating the REPEAT switch.

When the REPEAT switch is actuated, a signal is applied to the line 90 and passed through the OR gate 85 to the rewind control line 94 rewinding the video and audio tape as described previously. The REP signal on line 90 also enables the AND gates 82 and 83 so that when start interrogation control signal (ST/INT) appears on line 96, it is passed through AND gate 83 and OR gate 86 to the tape stop control line 98. It is contemplated that a recorder be used wherein the previously recorded data is automatically erased during a recording operation so that it is not necessary to erase during the REPEAT mode of operation. However, if it were desired to include a separate erase function during the REPEAT mode, the REPEAT signal appearing on line 90 could be used directly to initiate this function.

There are a number of ways in which the REPEAT mode could be handled. Since the interview on the film cartridge has already been recorded on video tape, theoretically it would not be necessary to rewind the projector cartridge at all since it would be possible during the REPEAT mode to replay the interview recorded on the video tape onto the video monitor screen 76. However, in the preferred embodiment, the film within the cartridge is also rewound so that the entire interview and presentation recording sequence takes place just as it did initially. Thus, the REPEAT signal on line 90 is applied through an OR gate 91 to a projector rewind control line 92 which, in any desired fashion, causes the film within projector 10 to rewind. The same signal on line 90 is applied through an OR gate 84, and a delay line 95 to enable an AND gate 97, the output 99 of which is adapted to stop the rewind operation of projector 10. Hence when the next END/INT signal appears on line 54 (which indicates the start of the interrogation to be repeated), gate 97 opens and projector 10 is stopped. If a separate control tone were used during rewind operations, delay line 95 (which merely assures that the rewind operation will be initiated) would not be required.

The projector rewind operation during the REHEARSE mode is similar to that occurring during the REPEAT mode. Thus, a PROJECTOR REWIND (P/REW) signal is applied to line 101 through a separate switch (not shown) which is actuated by the individual when he has completed his rehearsal. This signal is applied through OR gate 84 to the projector rewind control line 92. After a delay (of delay 95) AND gate 97 is enabled so that when an END/INT signal appears on line 54 (indicating the start of the rehearsed interrogation sequence 17B), AND gate 97 opens, passing a signal to projector stop rewind control line 99. Delay line 95 inserts sufficient delay to prevent the existing END/INT signal on line 54 from opening gate 97 and thereby preventing the projector rewind. However, when the next END/INT signal appears on line 54 (indicating the beginning of the interrogation which was rehearsed), the P/REW signal on line 101 will have enabled AND gate 97 so that the projector stop rewind control line 99 is energized and the projector rewind operation terminated at the start of the interrogation just rehearsed.

During a projector rewind operation controlled by the signal on line 92, it will be desirable to mute the audio output of the projector (see FIG. 2) as well as to turn off the lamp, which can be done in an obvious fashion.

Although not shown in FIG. 3, it is further contemplated that various signal lights will be employed in an obvious fashion to indicate when both the tape and projector film cartridge have been rewound. Furthermore, it will be desirable to include specific means for insuring that the film in the projector is stopped precisely at a desired point so that no part of the filmed interrogation is lost. For this purpose, the projector stop control line 112 may drop the voltage on the projector motor just before the desired frame position is reached as determined (for example) by a light sensitive means responsive to the claw position. Alternatively, an electrical contact may be placed on the claw which is only closed when the claw is in a certain position so that suitable film position is assured.

When the subject has completed his recording, the entire video tape and film cartridge are rewound for subsequent use. For this purpose, a REWIND switch is actuated applying a signal to line 92 which is applied through OR gate 91 to rewind control line 92 of projector 10 to rewind the film. The REWIND signal is also applied through OR gate 85 to the rewind control line 94 of the video tape recorder 14 to rewind the tape. In this mode of operation, the system is impervious to the control signals recorded on both the tape and the film so that complete rewinding of both is assured. Special means, either mechanical or electrical, may be employed to stop the rewind operation of the film cartridge and tape deck just prior to the end of the tape. If desired, a separate control signal may be recorded on the video tape for this purpose.

Although a preferred embodiment of the invention has been illustrated and described, numerous modifications thereof will be obvious to those skilled in the art. For example, the interrogation need not be presented by way of a film projector and might instead be presented as a reproduction from a second video tape. A slow scan video tape recorder would be particularly desirable for this purpose. Also, it is not mandatory, as to the basic features of the invention, that the interrogation and response be recorded on video tape. Other equivalents, such as disc recording or photography, may also be employed. Moreover the invention may be employed with a greater or less degree of automation than that illustrated herein.

What is claimed is:

1. Audio visual apparatus for making an audio and video recording of the interrogation of an individual and his response to such interrogation, comprising
   first means for optically displaying the prerecorded image of an interrogator and audibly replaying a prerecorded interrogation,
   means for recording said image and interrogation,
   visual pickup means for transmitting electrical signals corresponding to the image of said individual,
   audio pickup means for transmitting electrical signals corresponding to the response of said individual to said interrogation, and
   means for switching the input to said recording means from said first means to said visual pickup means and audio pickup means to thereby sequentially record the audio and visual portions of said interrogation and response, respectively.

2. Audio visual apparatus according to claim 1, wherein said recording means comprises a video tape recorder and said visual pickup means comprises a video camera.

3. Audio visual apparatus according to claim 2, including
   means responsive to the end of a prerecorded interrogation for actuating said switching means.

4. Audio visual apparatus according to claim 3, including
   means for recording control signals on said video tape for indicating the start of a recorded interrogation and the end of a recorded response thereto.

5. Audio visual apparatus according to claim 4, including
   playback means responsive to said control signals for replaying a selected portion of said video tape.

6. Audio visual apparatus according to claim 3, including means for selectively disabling said video tape means during operation of said first means.

7. Audio visual apparatus according to claim 3, wherein said first means includes a film projector and further including
   a screen,
   means for reflecting a portion of the optical output of said projector to said screen along a first optical path,
   means for reflecting a portion of the optical output of said film projector to said video camera along a second optical path, and
   means responsive to said switch actuating means for blocking said second path at the end of a prerecorded interrogation.

8. Audio visual apparatus according to claim 7, wherein said blocking means interrupts the optical path between said individual and video camera during playback of said prerecorded image.

9. Audio visual apparatus according to claim 8, wherein said projector is adapted to project an image onto said screen upon termination of a prerecorded interrogation.

10. A process for making an audio and visual record of the interrogation of an individual and his response to such interrogation, comprising
    optically displaying the prerecorded image of an interrogator and audibly replaying a prerecorded interrogation,
    simultaneously recording said image and interrogation on a record medium, and
    recording the visual and audio response of said individual to the interrogation on said record medium at the termination of said interrogation.

11. A process according to claim 10, including the step of recording control signals on said record medium to segregate successive interrogation-response record cycles.

References Cited

UNITED STATES PATENTS

| | | | |
|---|---|---|---|
| 3,077,038 | 2/1963 | Williams et al. | 35—9 |
| 3,158,431 | 11/1964 | Gutjahr et al. | 35—22 X |
| 3,181,253 | 5/1965 | Candreva et al. | 35—9 X |
| 3,210,864 | 10/1965 | Tillotson et al. | 35—9 |
| 3,341,276 | 9/1967 | Prater | 352—37 |
| 3,353,280 | 11/1967 | Emde | 35—9 |

RICHARD MURRAY, Primary Examiner

R. K. ECKERT, Jr., Assistant Examiner

U.S. Cl. X.R.

35—22